US 011396066 B2

(12) United States Patent
Lopez

(10) Patent No.: US 11,396,066 B2
(45) Date of Patent: Jul. 26, 2022

(54) POSTER HANGER WITH VARIOUS SIZED PLASTIC AND OR VINYL SHEET PROTECTORS AND METHOD OF MANUFACTURING

(71) Applicant: Lindsey Brandy Lopez, Arroyo Grande, CA (US)

(72) Inventor: Lindsey Brandy Lopez, Arroyo Grande, CA (US)

( * ) Notice: Subject to any disclaimer, the term of this patent is extended or adjusted under 35 U.S.C. 154(b) by 0 days.

(21) Appl. No.: 17/327,751

(22) Filed: May 23, 2021

(65) Prior Publication Data

US 2021/0370451 A1 Dec. 2, 2021

Related U.S. Application Data

(60) Provisional application No. 63/031,237, filed on May 28, 2020.

(51) Int. Cl.
| | | |
|---|---|---|
| *B23P 15/00* | (2006.01) | |
| *G09F 15/00* | (2006.01) | |
| *G09F 7/18* | (2006.01) | |
| *G09F 7/22* | (2006.01) | |

(52) U.S. Cl.
CPC .............. *B23P 15/00* (2013.01); *G09F 7/18* (2013.01); *G09F 7/22* (2013.01); *G09F 15/0006* (2013.01)

(58) Field of Classification Search
CPC .......... B23P 15/00; A47F 7/0042; G09F 7/18; G09F 7/22; G09F 2007/1891; G09F 15/0068
See application file for complete search history.

(56) References Cited

U.S. PATENT DOCUMENTS

| | | |
|---|---|---|
| 1,492,932 A | 5/1924 | Orrell |
| 1,709,041 A | 10/1926 | Schutt |
| 1,687,659 A | 11/1926 | Hall |
| 1,711,070 A | 9/1927 | Suydam, Jr. |
| 1,685,080 A | 9/1928 | Auchincloss |
| 1,880,165 A | 7/1932 | Winzeler |
| 2,065,624 A | 6/1936 | Summers |
| 2,194,010 A | 1/1939 | Cooke |
| 2,945,594 A | 7/1960 | Parker |
| 3,170,260 A | 2/1965 | Parker |
| 3,492,743 A | 2/1970 | Schmidl |
| 3,518,782 A | 7/1970 | Long |
| 4,178,710 A | 12/1979 | Schmid |
| 4,357,772 A | 11/1982 | Amick |
| 4,516,871 A | 5/1985 | Leitman |

(Continued)

FOREIGN PATENT DOCUMENTS

DE 9408640 U1 * 7/1994 ......... G09F 15/0087

*Primary Examiner* — Matthew P Travers

(57) ABSTRACT

A wall-mounted, metal, poster hanger, manufactured from aluminum, steel, iron and nylon or similar, using CNC tooling, injection molding, and extrusion of 25-30 parts that configures the poster hanger. The poster hanger is constructed primarily of a wall mounted plate and a pivoting arm with extension capabilities connected by a hinge and pivot pin with washers, configured with three stationary hooks and one hook on the extension arm. A nylon, ABS, or similar, snap hook is designed to lock the pivoting arm in place. Pre hole-punched, various sized, plastic sheet protectors, and or transparent dividers, hang from grommeted holes in sleeves and or sheet protectors onto the four rings and or hooks.

4 Claims, 29 Drawing Sheets

(56) References Cited

U.S. PATENT DOCUMENTS

| | | |
|---|---|---|
| 4,573,821 A | 3/1986 | Gilreath |
| 4,632,241 A | 12/1986 | Brough et al. |
| 4,666,409 A | 5/1987 | Sandberg |
| 4,756,556 A | 7/1988 | Ader |
| 4,784,508 A | 11/1988 | Shannon |
| 4,810,544 A | 3/1989 | Hickman |
| 4,886,390 A | 12/1989 | Silence |
| 4,982,883 A | 1/1991 | Earnest, Jr. |
| 5,011,191 A | 4/1991 | Gannon et al. |
| 5,265,359 A | 11/1993 | Glazer |
| 5,291,677 A | 3/1994 | Samson |
| 5,543,010 A | 8/1996 | Kang |
| 5,875,579 A | 3/1999 | Winzen |
| 5,903,991 A | 5/1999 | Sasse |
| 5,909,687 A | 6/1999 | Tapper |
| 6,012,594 A | 1/2000 | Heinz |
| 6,012,866 A | 1/2000 | Podosek |
| 6,071,030 A | 6/2000 | Hunter et al. |
| 6,109,456 A | 8/2000 | Heinz |
| 6,138,391 A | 10/2000 | Ngan |
| 6,253,475 B1 | 7/2001 | Ruebens |
| 6,481,054 B1 | 11/2002 | Hillstrom |
| 6,632,042 B1 | 10/2003 | Liener Chin et al. |
| 6,665,967 B1 | 12/2003 | Quackenbush |
| 6,666,609 B2 | 12/2003 | Fanning |
| 6,764,241 B1 | 7/2004 | Tower |
| 6,802,145 B2 | 10/2004 | Sparkowski |
| 6,820,853 B1 | 11/2004 | Dubarry |
| 6,654,202 B2 | 2/2005 | Ives et al. |
| 6,851,718 B2 | 2/2005 | Liener Chin et al. |
| 6,854,915 B1 | 2/2005 | Ong |
| 6,895,702 B1 | 5/2005 | Colbert |
| 7,043,859 B1 | 5/2006 | Meyer |
| 7,059,482 B2 | 6/2006 | Reid et al. |
| 9,734,740 B1 | 8/2017 | Lopez |
| 2002/0133988 A1 | 9/2002 | Spelman |
| 2003/0079389 A1 | 5/2003 | Eberly |
| 2005/0193610 A1 | 9/2005 | Rost |
| 2011/0129290 A1 | 6/2011 | Danko |
| 2020/0312201 A1* | 10/2020 | Olds .................. G09F 7/22 |

* cited by examiner

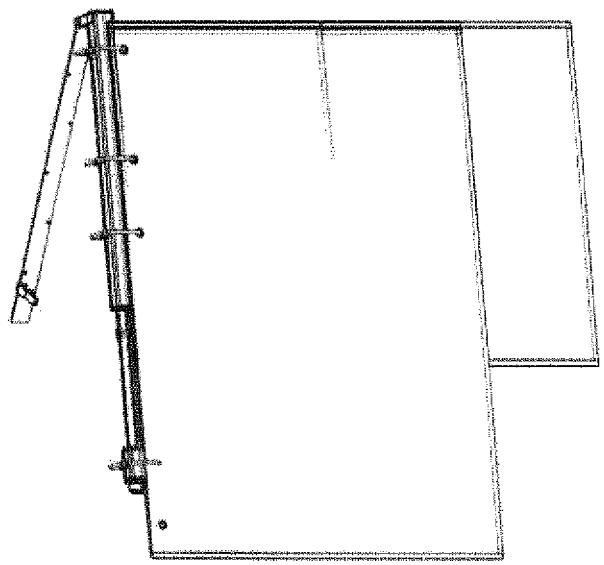
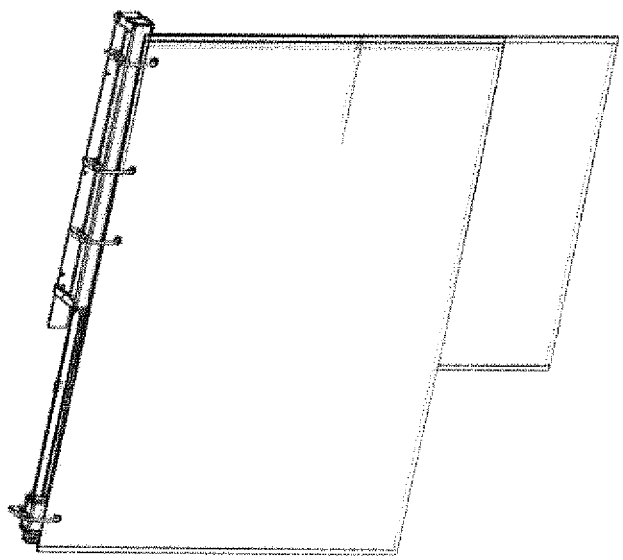
FIG 5

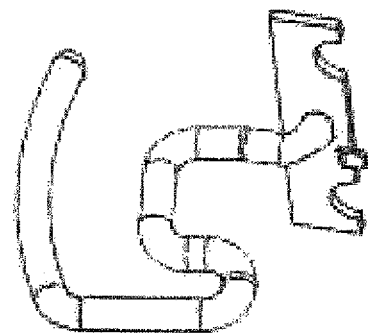
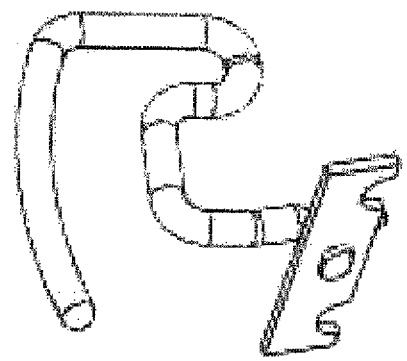
FIG. 21

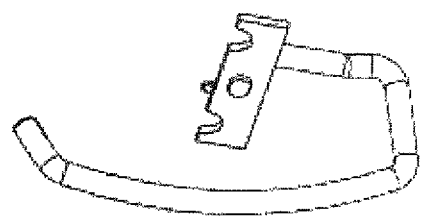
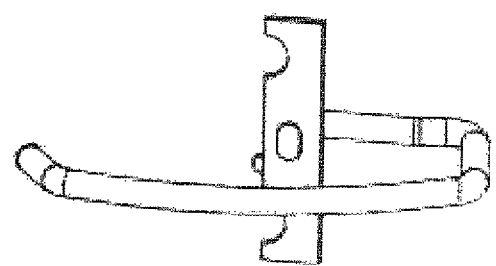
FIG. 22

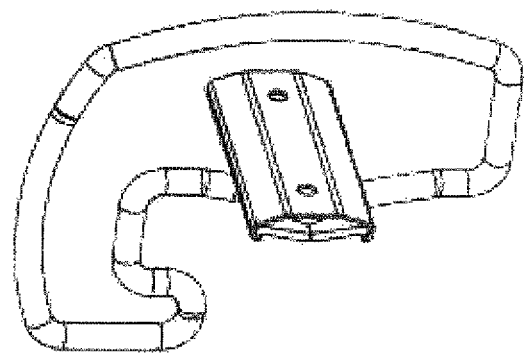
FIG. 23
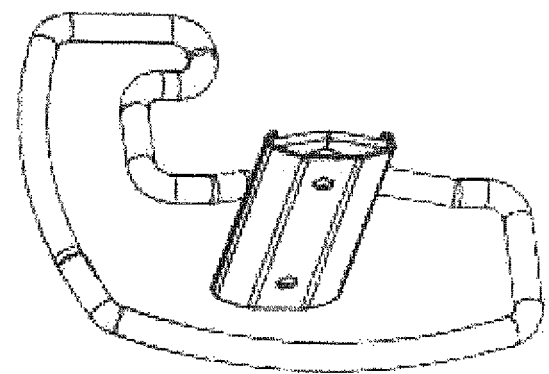

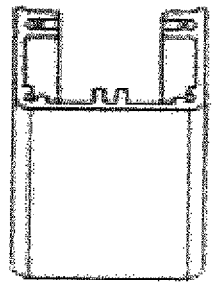
FIG. 25
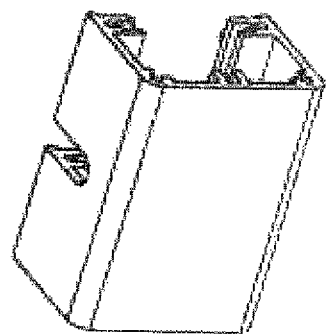

POSTER HANGER WITH VARIOUS SIZED PLASTIC AND OR VINYL SHEET PROTECTORS AND METHOD OF MANUFACTURING

PRIORITY UNDER 35 U. S. C SECTION 119(e) & 37 C.F.R. SECTION 1.78

This nonprovisional application claims priority based upon the following prior United States Provisional Patent Application entitled: Poster Hanger with Various Sized Plastic and or Vinyl Sleeve Protectors, Application No. 63/031,237 filed May 28, 2020, in the name of Lindsey Lopez, which is hereby incorporated by reference for all purposes.

FIELD OF INVENTION

This invention is an improvement on a current regulation compliance organizer, U.S. Pat. No. 9,734,740. More specifically this invention consists of 25-30 parts and is manufactured using CNC tooling, injection molding, and extrusion utilizing custom tooling and or machining. The materials used to manufacture said invention includes but is not limited to, aluminum, stainless steel, carbon steel, iron, nylon, ABS, PC-ABS plastic, vinyl, and similar. In reference to previous art under U.S. Pat. No. 9,734,740, the invention has multiple methods of use, and purposes that are not limited to but include; hanging, stacking, and flipping various small, medium, and large posters, notifications, bulletins, workplace and government regulations, art, educational tools, presentations, blueprints, development plans, and many other posters, pages, and compartmentalized plastic and or vinyl sleeves for storage, display, and organizational purposes.

BACKGROUND OF THE INVENTION

Not enough wall space. Walls of commercial, government, and institutional establishments are cluttered with government regulations, labor laws, and other notifications in a workplace. Children's art clutters the refrigerator and walls at home. Restaurants have limited space in their kitchens for food prep-compliance as well as limited wall space in their breakrooms. Architects, developers, and engineers have few options to easily access and view their blueprints and plans on a wall. Gallery's have few options to hang various art pieces in the same area of wall space. Jewelry designers and other trades using small tools and objects have few options to store and easily access their beads, tools, and other materials while affixed to the wall. The walls of businesses, schools, restaurants, institutions, hospitals, homes, and other establishments are cluttered with mandatory compliance in addition to other notifications, labor laws, art, and other posters presenting an opportunity and need for organization.

SUMMARY

My solution (invention) is a wall-mounted, metal, extendable, poster hanger FIG. 4 designed with various sized pre-holepunched vinyl and or plastic sheet protectors and or sleeve dividers FIG. 16-19. The sleeves are designed to showcase and protect paper and similar materials, tools, and like objects, while the poster hanger functions to declutter and organize walls through the method of hanging, stacking, flipping and displaying of any small, medium, and large posters, pages, sheets, sleeves, notifications, bulletins, workplace safety and regulation standards and or guidelines, mandatory government regulations, union labor law and or safety standards, restaurant food prep instructions, restaurant compliance and safety procedures and or guidelines, educational tools, presentations, displays, blueprints, building development plans, tools, art; inclusive but not limited to, gallery art, children's art, school art and similar items designed to be hung and easily accessible while on display.

The materials used in manufacturing the poster hanger apparatus are, iron, aluminium, stainless steel, nylon, carbon steel, ABS, PC-ABS, and or similar materials. The full apparatus is manufactured with CNC manufacturing, injection molding, and extrusions using custom tooling and or machining. Such processes in the manufacturing process are as follows: The extruded frame parts are made from aluminum extrusions, where they are then cut to length and some features are machined out. They are then sandblasted and anodized. All plastic parts are injection molded out of ABS or PC-ABS plastic or similar. The sheet metal parts are bent sheets of carbon steel or aluminum and then powder coated if they are steel or anodized if aluminum. The hinge pin is CNC turned on a lathe and made of steel or similar material. The materials used in manufacturing the clear and or frosted sleeves and or sheet protectors are vinyl and or plastic using die cutting and molding.

The poster hanger is assembled using 25-30 parts. The poster hanger is constructed primarily of a wall-mounted plate and or arm FIG. 6, a pivoting arm FIG. 7 with extension capabilities FIG. 8, configured with a pivot pin and hinge FIG. 10-11. Three stationary rings consist of a long top hook plate FIG. 12 and long bottom hook plate FIG. 13 enclosed within a snap housing plate FIG. 15 configuring the full closed and connected long top and long bottom ring and or hook FIG. 14; A single ring and or hook with a small top hook plate FIG. 21 and a small bottom hook plate FIG. 22 on the extension end of the pivoting arm FIG. 8 encased within the a small snap housing plate FIG. 26 configuring the full closed and connected small top and small bottom ring and or hook FIG. 23 said parts are then enclosed in a smaller extruded aluminum casing FIG. 25. The short and long snap housing plate operates by opening and closing the top hooks and bottom hooks creating an opened or closed ring and or hook for the purpose of hanging the sheet protectors and or posters FIG. 5. The short and long snap housing plate is connected to an extendable slider FIG. 27 and slider bushing FIG. 36 which is encased in an extruded aluminium casing FIG. 20 that is then connected with hex socket countersunk head screws FIG. 37 to a short cover FIG. 30 and long cover FIG. 9. The metal slider FIG. 27 is designed to extend and retract several inches by means of pull tab FIG. 34 from 22" to 36" FIG. 31-32 in and out of the pivoting extruded arm FIG. 7. Said measurement is calculated from the first ring and or hook on the hinge end, to the single ring and or hook on the extension end. The mounted wall plate and or arm features multiple holes FIG. 6 for screw placement wherein the arm can be mounted to a vertical surface. The wall mounted plate has the capacity to adhere to heavy-duty double-sided adhesive to remain stationary on the wall when affixed to the wall. The mounted wall plate also has an ABS (Acrylonitrile Butadiene Styrene) or similar plastic, lock-mechanism or snap-hook FIG. 29 affixed to the wall mounted plate FIG. 38. The purpose of the snap hook feature ensures the pivoting arm will lock in place when closed FIG. 31 and or extended FIG. 32. When the device is fully assembled the mounting plate, the pivoting arm, and extendable arm works collectively as a single unit FIG. 33. The pivoting arm FIG. 33 rotates 90°-180° to easily access and flip pages, one behind the other. This extending arm has a push and or pull tab FIG. 34 attached to the slider FIG. 27 at the non-hinged end FIG. 8. The rings and or hooks have a specific shape FIG. 24 and function. The function of the ring and or hook can house multiple posters, pages, and or sleeve dividers in one area on a wall in order to hang multiple posters, papers, and or sleeves stacked one on top of the other. The rings and or hooks open and close to accommodate hole-punched sleeves, posters, papers, and similar materials that can hang, stack, and flip one page, poster, sleeve on top of the other by rotating the pages, posters, sleeves, and other similar materials 360° around the pivoting arm ensuring placement of pages, posters, sleeves, and similar materials remains in place within the ring and or hook curved-groove FIG. 24 without damaging the hanging object/s. This solution offers easy, compliant, and convenient access to hanging, stacking, and flipping posters, sheet protectors, sleeves, and or papers of various sizes.

The hole-punched vinyl and or plastic sheet protectors of various sizes are inclusive but not limited to the following sizes: 40×30," 26×40," 22×30," and 16×18" FIG. 16-19. The various sized sleeves and or sheet protectors also feature compartmentalized windows in various sizes for various purposes, some of which include but are not limited to, storage and organization of small toys, collector cards, beads, jewelry, tools, and or other similar items. The holes in the sleeves and or sheet protectors are set at specific points across the top of each sleeve to readily hang onto each hook and or ring placement on the pivoting arm and extending arm FIG. 7.

Current solutions do not hang, stack, and flip multiple items that are typically hung on a wall. The poster hanger with vinyl and or plastic sleeves organizes and stores paper materials, tools, and similar items. This device is a tool to declutter office and home walls. This device offers accessible viewing by hanging, stacking, and flipping multiple small, medium, and large paper materials, posters, government mandated compliance, notifications, art, tools, and other similar items that have a need to be hung for display and or viewing purposes. This solution provides organized storage and showcasing that is easy and compliant for offices, homes, restaurants, schools, hospitals, and other establishments.

BRIEF DESCRIPTION OF FIGURES

A more complete understanding of the present invention may be had by reference to the following Detailed Description and appended claims when taken in conjunction with the accompanying Drawings wherein:

FIG. 5 Is a perspective view of the present invention with the large sleeve protectors;
FIG. 21 Is a detailed view of the short top hook plate;
and
FIG. 22 Is a detailed view of the short bottom hook plate;
and
FIG. 23 Is a detailed view of the short hook subassembly on short snap housing plate;
FIG. 25 Is a detailed view of the short extruded extension arm.

DETAILED DESCRIPTION OF FIGURES

Figure 1:
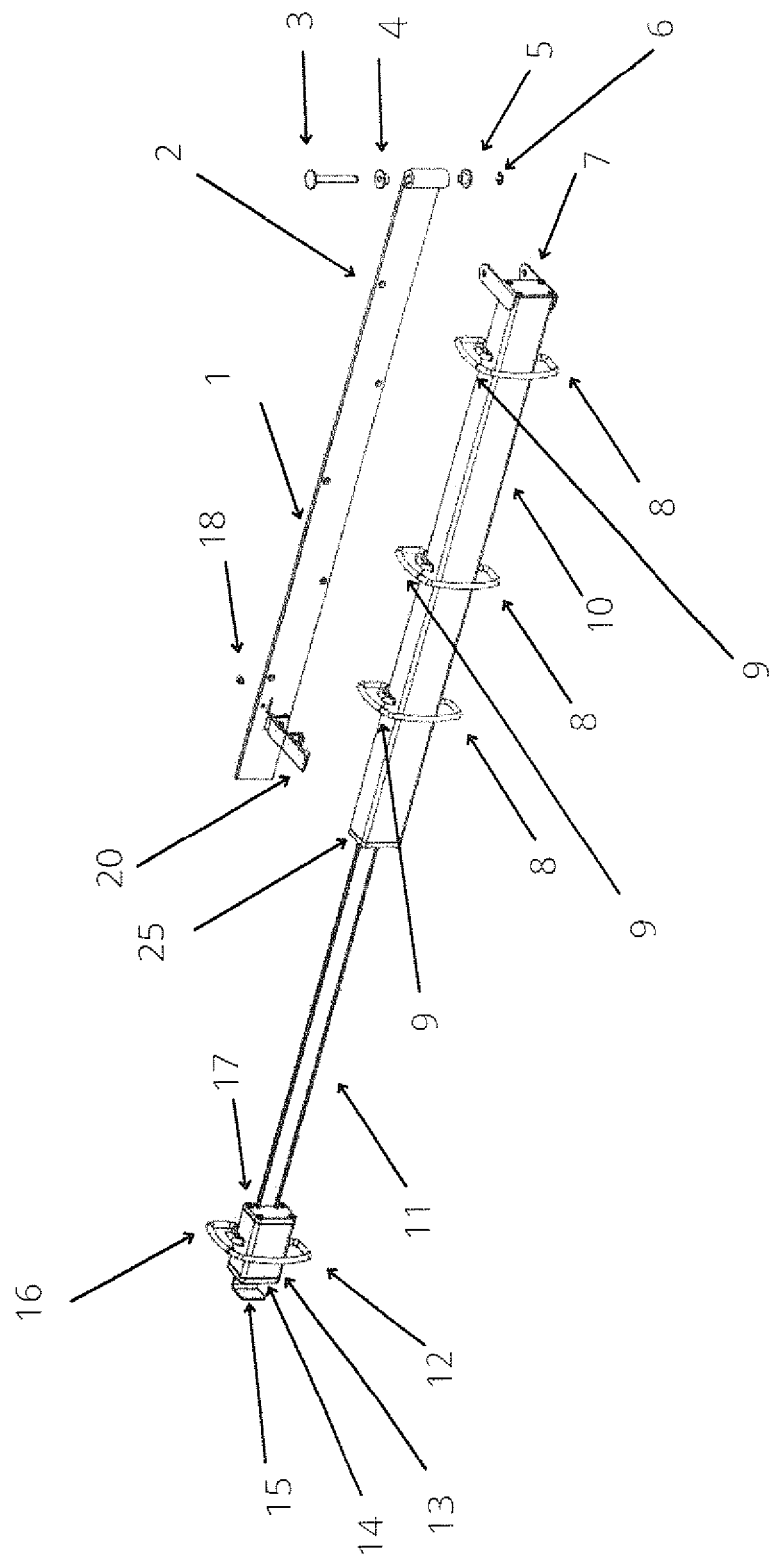
FIG. 1 is an exploded view of the top level assembly.

Referring now to the drawings submitted herewith, wherein various elements depicted therein are not necessarily drawn to scale and wherein through the views and figures like elements are referenced with identical reference numerals, there is illustrated a poster hanger with various plastic and or vinyl sleeve and or sheet protectors constructed according to the principles of the present invention. An embodiment of the present invention is discussed herein with reference to the figures submitted herewith.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring to FIG. 1, the Poster Hanger includes two structural arms as the foundation of the poster hanger. The mounting plate 1 is manufactured from iron, aluminium, carbon steel, stainless steel, or similar using CNC tooling and injection molding. The mounting plate 1 features several holes 2 for mounting onto vertical surfaces. Affixed to the mounting plate is a snap hook 20 constructed of ABS, PC-ABS, nylon, or similar material. The mounting plate 1 is assembled to the pivoting arm FIG. 7 with a pivot pin 3 and washer 4 that is inserted into the hinge 7 on the pivoting arm 10. The pivoting arm in FIG. 1 features the long extruded arm and or casing 10, long top hook plate 9, long bottom hook plate 8, the slider 11, end caps 17, 14, 25, short top hook plate 16, short bottom hook plate 12, extruded short extension arm 13, and twenty seven hex socket countersunk head screws 18. The purpose of the pivoting arm is to hang, stack, and flip various posters, sheet protectors, sleeves, papers, and similar materials while providing an extension on the slider 11 to fit extra large posters and or sheet protectors.

Figure 2:
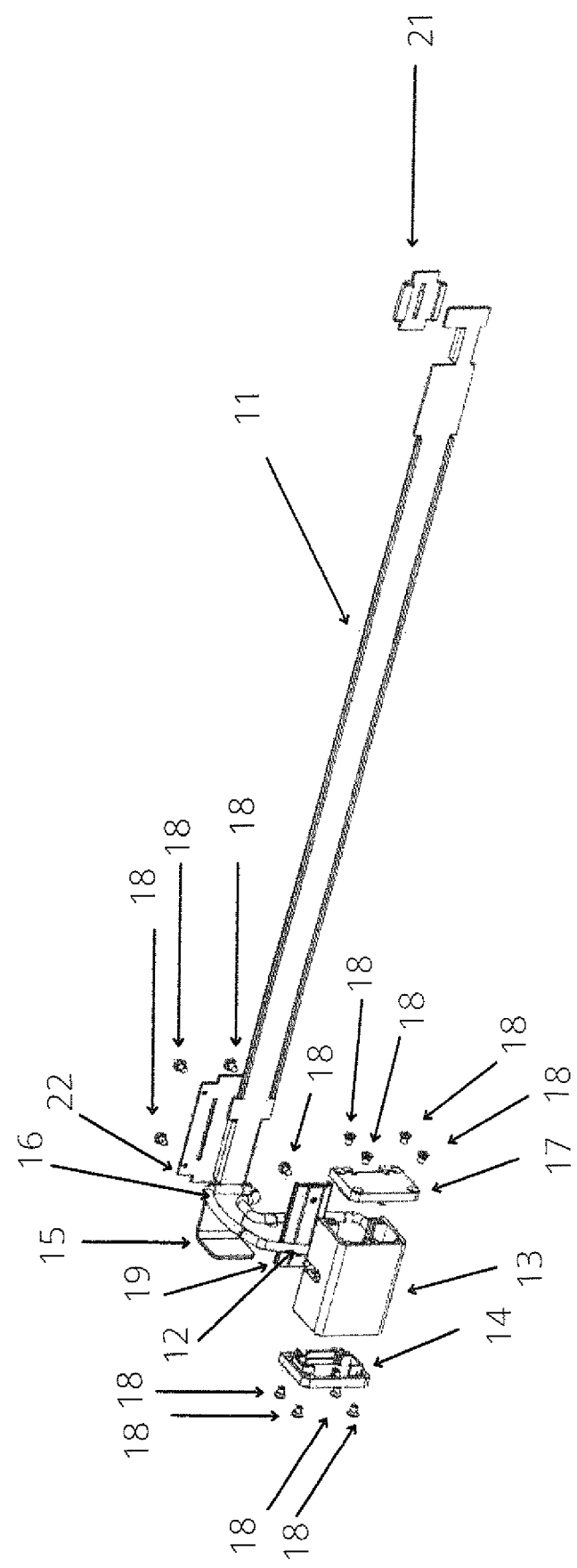
FIG. 2 is an exploded view of the extension subassembly.
Figure 7:
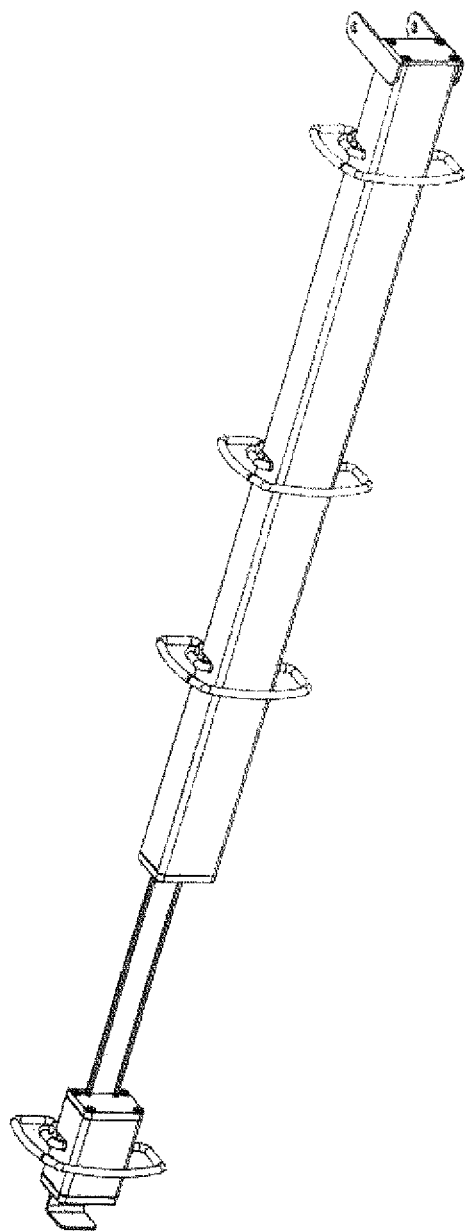
FIG. 7 Is a detailed view of the pivoting arm subassembly.

Referring to FIG. 2, the extension arm subassembly operates with the pivoting arm FIG. 7 and consists of the short top hook plate 16 short bottom hook plate 12 on the short snap housing plate 19 with end caps 17, 14 on either end of the short extruded extending arm 13 the slider 11 wherein operates extended and retracted by means of the pull tab 15. The slider blushing 21 small cover 22 with twelve hex socket countersunk head screws 18 enables the pivoting arm 10 to extend, retract, and operate the single ring and or hook consisting of the short top hook plate 16 short bottom hook plate 12 and short snap housing plate 19 when in use.

Figure 3:
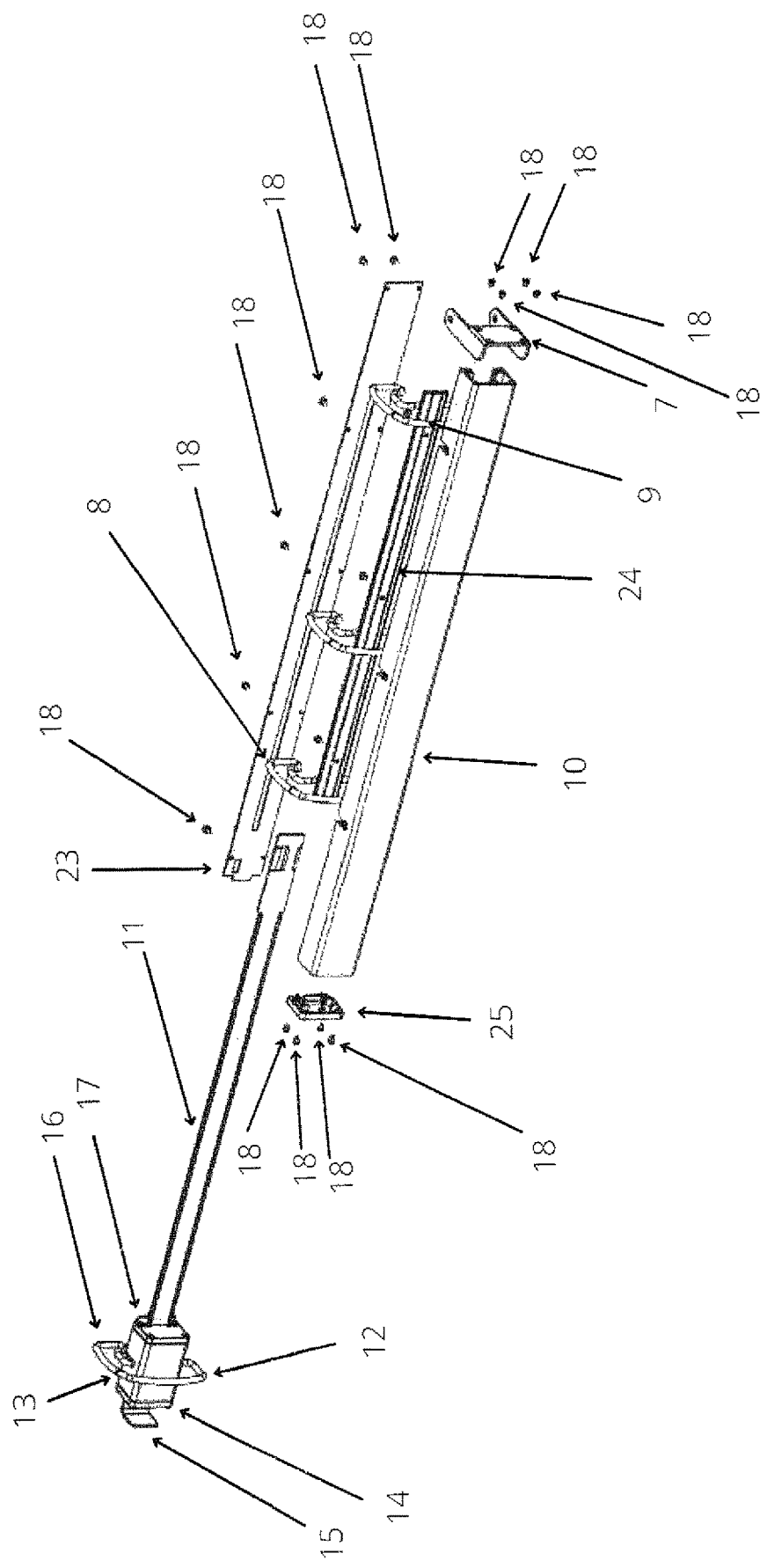
FIG. 3 Is an exploded view of the arm subassembly.

Referring to FIG. 3, the exploded view of the arm subassembly displays the complete pivoting arm FIG. 7 inclusive of the extension arm subassembly FIG. 2. The long top hook plate 8 with the long bottom hook plate 9 is manufactured within the long snap housing plate 24. Herein collectively operates the open and close function with the long bottom hook plate 9 and long top hook plate 8 in order to hang, stack, and or flip sleeves, sheet protectors, dividers, posters, papers, and similar materials within the grooved hook FIG. 24. The long top hook plate 8 the long bottom hook plate 9, long snap housing plate 24 are encased within the extruded arm 10 which is connected to the long cover 23 by means of fourteen hex socket countersunk head screws 18 and operable with the hinge 7. The end cap 25 affixed with hex socket countersunk head screws 18 at the end of the long extruded arm 10 the end cap 25 abuts with the end cap 17 which is fastened to the short extruded extension arm 13 that houses the short snap housing plate 19, short top hook plate 16, and short bottom hook plate 12. In the closed position FIG. 31 the short extruded extension arm 13 abuts at the end cap 17 to the end cap 25 attached to the long extruded arm 10 fastened with the hex socket countersunk head screws 18.

Figure 4:
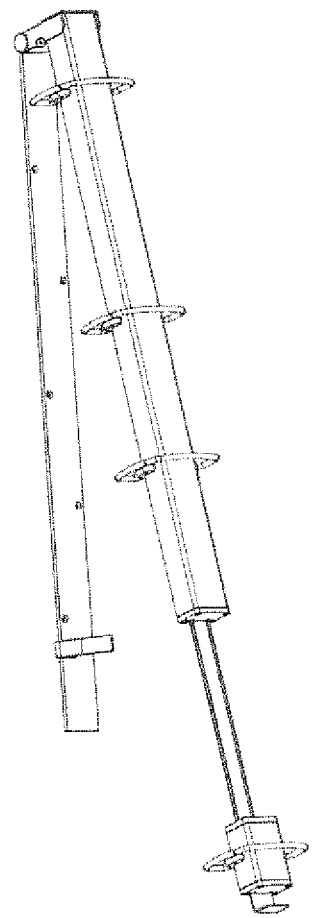
FIG. 4 Is a perspective view of the present invention.

FIG. 4 herein, is the fully assembled poster hanger in the opened and extended position encompassing all the parts listed within FIG. 1-3.

FIG. 5 herein, functions to allow the sleeves, sheet protectors, dividers, posters, and similar, to hang from the short bottom hook plate 12 and the long bottom hook plate 9 in the extended, closed to the wall position, utilizing the snap hook 20 and slider 11. When the pivoting arm in FIG. 7 is swung away from the mounting plate 1 by 90° or greater FIG. 33 the posters, sleeves, sheet protectors, paper, and or other materials that hang from the hooks and or rings provides options to flip one poster and or sleeve divider behind the other for easy accessibility and viewing purposes.

Figure 6:
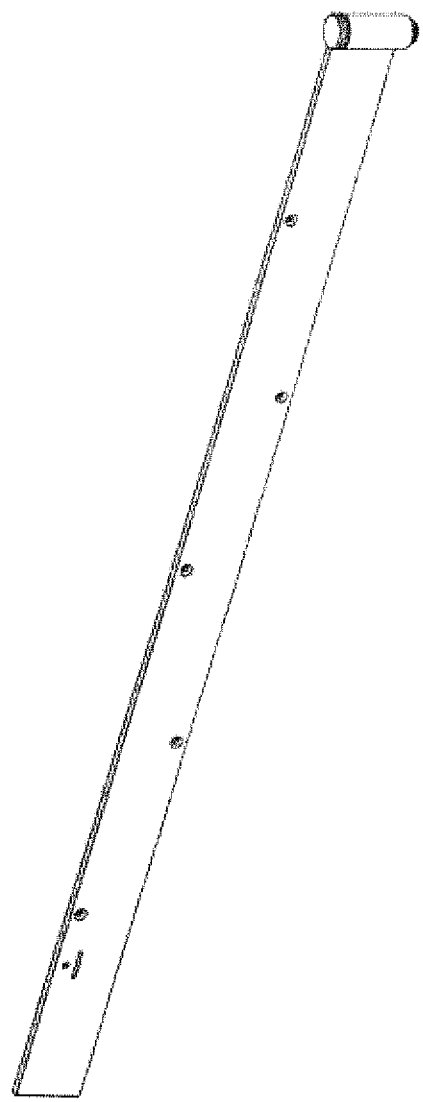
FIG. 6 Is a detailed view of the mounting plate of the present invention.

FIG. 6 herein, is the mounting plate 1 with the pivot pin 3 and pivot washers 4 inserted within the opening where the mounting plate 1 will connect to the hinge 7. Five staggered holes 2 for mounting with screws to a vertical surface measure on center construct the mounting plate 1 manufactured with iron, carbon steel, stainless steel, aluminium or similar.

FIG. 7 herein, is the assembled pivoting arm consisting internally of the long top hook plate 8 long bottom hook plate 9, short top hook plate 16, short bottom hook plate 12, the short snap housing plate 19, long snap housing plate 24, slider 11 and slider bushing 21 encased within the long extruded arm 10 and the short extruded arm 13 together with the long cover 23 short cover 22, fastened by twenty seven hex socket countersunk head screws 18. Operation of the hooks from opened to closed function by means of the long snap housing plate 24 and short snap housing plate 19 for the purpose to hang, stack, and flip the sleeves, sheet protectors, dividers, posters, papers, and similar materials.

Figure 8:
FIG. 8 Is a detailed view of the extension subassembly.

FIG. 8 herein, is the assembled extended end on the pivoting arm on the slider 11. Enclosed within the short extruded arm 13 is the short top hook plate 16 short bottom hook plate 12 short snap housing plate 19 short cover 22 fitted with end caps 14, 17 fastened with twelve hex socket countersunk head screws 18.

The poster hanger features hooks and or rings for the purpose of hanging, stacking, flipping various posters, sleeves, sheet protectors, papers, or similar, to offer easy access and viewing to said objects. The four hooks and or rings are specific in shape referring in particular to FIG. 24. Three hooks and or rings are enclosed in the long extruded arm 10 and a single hook and or ring comprising the top short hook plate 16 the short bottom hook plate 12 and the short snap housing plate 19 is enclosed in the short extruded arm 13. The three hooks and or rings are comprised of a long top hook plate 8 long bottom hook plate 9 and long snap housing plate 24 enabling the hooks and or rings to open in order to place posters, sheet protectors, sleeves, papers, and similar materials onto the hooks and or rings, the hooks and or rings can then close to secure the posters, sleeves, sheet protectors, papers, and similar materials.

Figure 9:
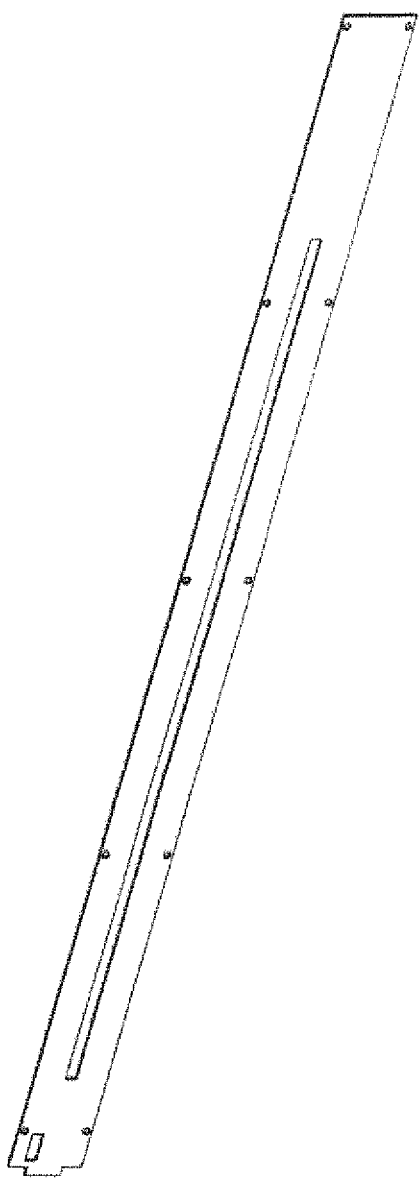
FIG. 9 Is a detailed view of the large cover.

FIG. 9 herein, is the large cover 23 that is connected to the long extruded arm 10 fastened with ten hex socket countersunk head screws 18 in order to enclose the long top hook plate 8 long bottom hook plate 9 and long snap housing plate 24 slider 11, and slider bushing 21. The long cover features an open slit opposite the hinge 7 end to house the snap hook 20.

Figure 10:
FIG. 10 Is a detailed view of the pivot pin and pivot washer.

FIG. 10 herein, is the pivot pin 3 and pivot washer 4 that once inserted into the mounting arm 1 and the pivoting arm FIG. 7 all 25-30 parts operate as a single unit.

Figure 11:
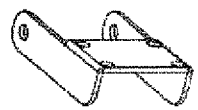
FIG. 11 Is a detailed view of the hinge.

FIG. 11 herein, is the hinge 7 when assembled with the pivot pin 3 and pivot washer 4 herein is connected to the pivot arm FIG. 7 and mounting plate 1.

Figure 12:
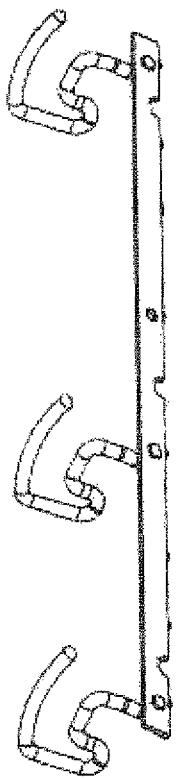
FIG. 12 Is a detailed view of the long top hook.

FIG. 12 herein, is the long top hook plate and or ring plate 8 housing three stationary rings and or hooks featuring a curved hook to house large posters, pages, papers, sleeves and or sheet protectors when flipped behind which operate in conjunction with the long bottom hook plate and or ring plate 9.

Figure 13:
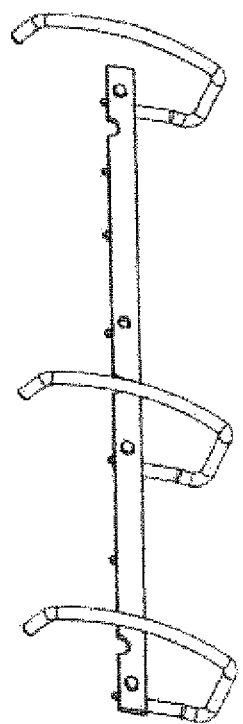
FIG. 13 Is a detailed view of the long bottom hook.

FIG. 13 herein, is the long bottom hook plate and or ring plate 9 housing three stationary rings and or hooks that operated in conjunction with the long top hook plate and or ring plate 8

Figure 14:
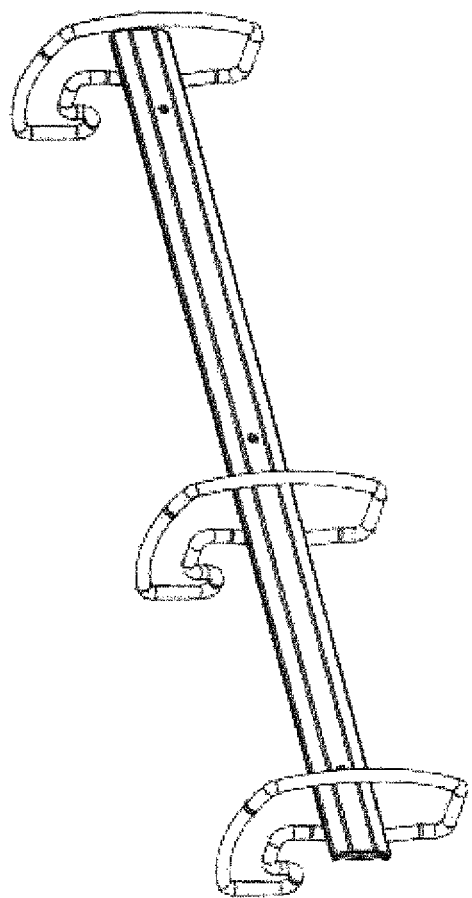
FIG. 14 Is a detailed view of the long hook subassembly and long snap housing plate.

FIG. 14 herein, is the long hook subassembly and long snap housing plate 24 that when assembled encases the long bottom hook plate 9 and the long top hook plate 8 providing the open and close features of the rings and or hooks.

Figure 15:
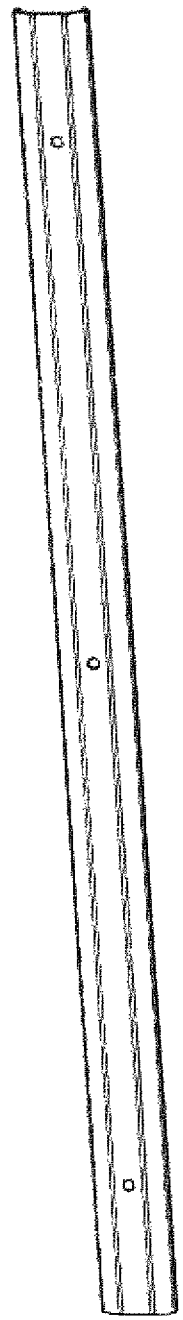
FIG. 15 Is a detailed view of the long snap housing plate.

FIG. 15 herein, is the long snap housing plate 24 which encases the long bottom hook plate 9 and the long top hook plate 8 providing operation of the open and close function.

Figure 16:
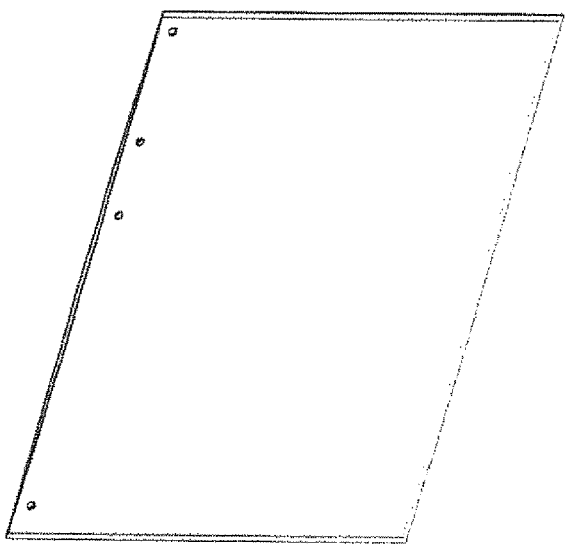
FIG. 16 Is a detailed view of the extra large horizontal sleeve divider and or protector.
Figure 17:
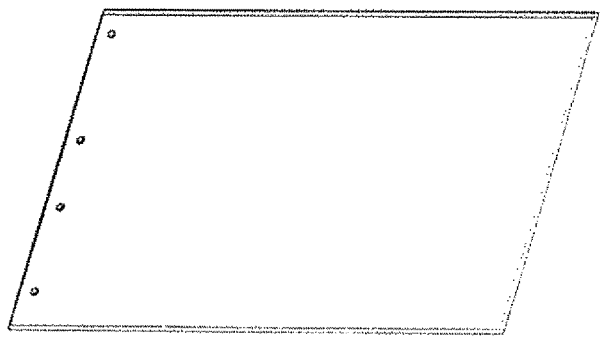
FIG. 17 Is a detailed view of the large vertical sleeve divider and or protector.
Figure 18:
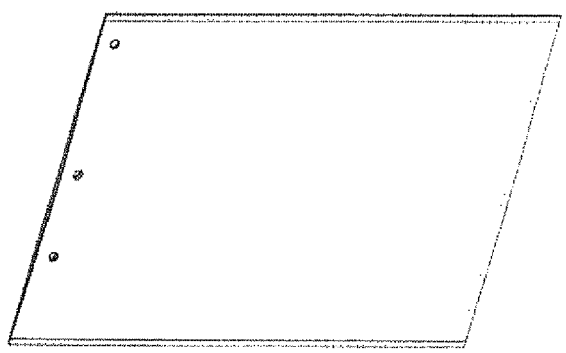
FIG. 18 Is a detailed view of the medium sleeve divider and or protector.
Figure 19:
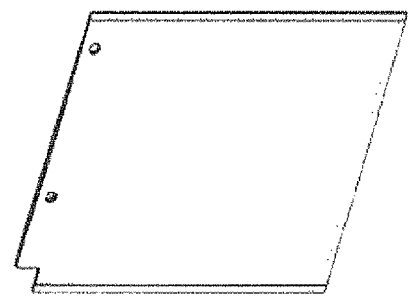
FIG. 19 Is a detailed view of the small sleeve divider and or protector.

FIG. 16 herein, the large sleeves, dividers, and or sheet protectors are accessories to the poster hanger and are available in various sizes. Not all sleeve sizes are featured; sleeves and or sheet protectors come in a variety of sizes. The primary four sleeves are referenced here as extra large horizontal, large vertical, medium, and small. The extra large size sleeves, dividers, and or sheet protectors are specific in size with the largest being a horizontal sleeve measuring 998 mm×762 mm for the purpose of fitting federal and state mandated compliance posters. The large size sleeve is vertical and measures 640 mm×1006 mm. The medium horizontal sleeve measures 772 mm×538 mm and the smallest sleeve measures 457.2 mm×386.5 mm. The sleeves are pre hole-punched at specific points that match up exactly with the bottom long hook plate 9 and short bottom hook plate 12 when fully extended using slider 11 or when closed and in locked position with the snap hook 20. Referring to FIG. 16 there are four holes across the top of the extra large sleeve protector. The hole measurements on the extra large sleeve, from right to left hook and or ring on the hinge 7 end measures 215.9 mm between the first two holes. From the first hole to the third hole measures 355.6 mm, the first hole to the last hole held by the single short bottom hook plate 16 measures 901.7 mm. The four holes on the large sleeve FIG. 17 measure the same as the extra large for the first three holes. The last hole on the vertical large sleeve furthest from the hinge 7 end measures 559.6 mm from the first hole on to the last hole nearest the single hook on the pivoting arm. There are three holes on the medium sleeve FIG. 18 which also measures 215.9 mm from the first hole at the hinge end 7 and 355.6 mm from the first to third hole. The three holes on the smallest sleeve FIG. 19 match the exact measurements of the medium sleeve which measures 215.9 mm from the first hole at the hinge end 7 and 355.6 mm from the first to the third hole.

Figure 20:
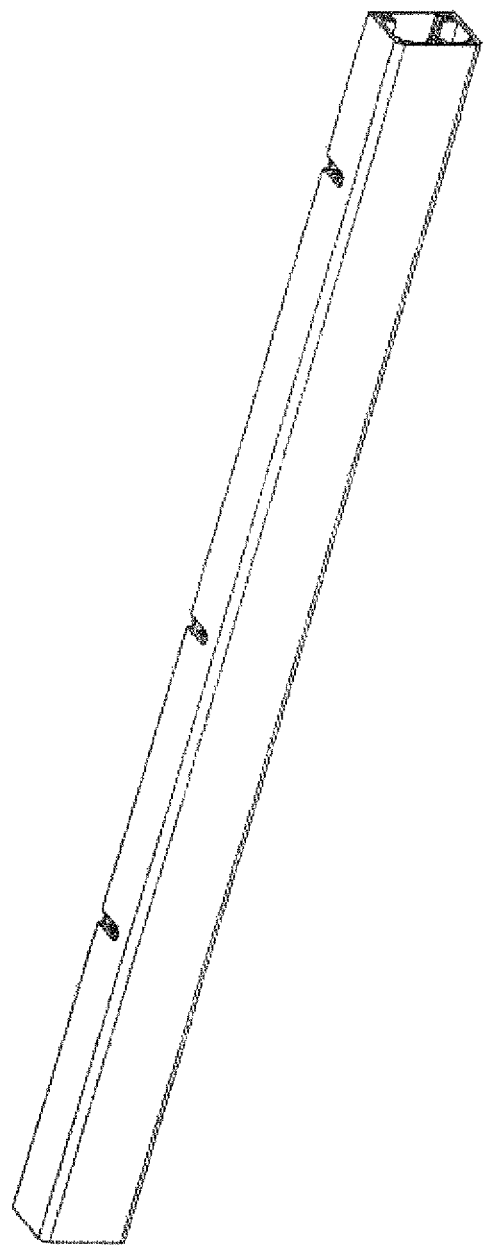
FIG. 20 Is a detailed view of the extruded pivot arm.

FIG. 20 herein, is the long extruded aluminum or similar metal arm 10 that encases the long top hook and or ring plate 8, long bottom hook and or ring 9, snap housing plate 24, slider 11, slider bushing 21, and enclosed by means of the long cover 23 and ten hex socket countersunk head screws 18 fastened with an endcap 25 at the extendable end and hinge 7 on opposite end.

FIG. 21 herein, is the short top hook and or ring plate 16 featuring a curved hook to house large posters, pages, papers, sleeves and or sheet protectors when flipped behind which operate from open to close in conjunction with the short bottom hook plate and or ring plate 12 functioning collectively with the long bottom hook plate 9 and long top hook plate 8.

FIG. 22 herein, is the short bottom hook and or ring plate 12 that operates from open to close in conjunction with the short top hook and or ring plate 16 functioning collectively with the long bottom hook plate 9 and the long top hook plate 8.

FIG. 23 herein, is the short hook subassembly on the short snap housing plate 19 which allows operation of the short top hook and or ring plate 16 and short bottom hook and or ring plate 12 to open and close simultaneously in order to accommodate large posters, pages, papers, sleeves and or sheet protectors while operating in conjunction with the long hook subassembly FIG. 14

Figure 24:
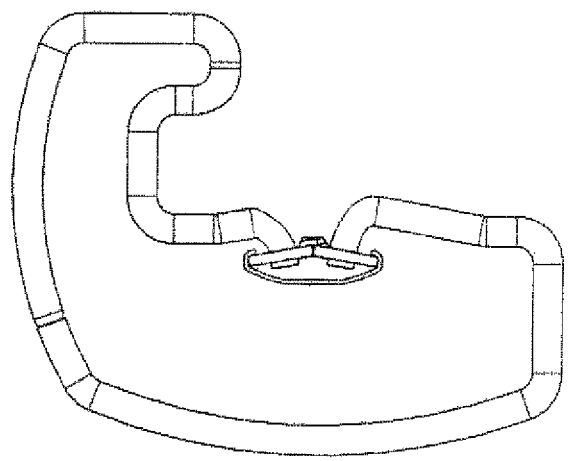
FIG. 24 Is a detailed view of the combined top and bottom hook closed.

FIG. 24 herein, features the top hook and or ring plate 16, 8 with the bottom hook and or ring plate 12, 9 in the closed position detailing the curved hook and or ring feature as shown on the long top hook plate 8 and short top hook plate 16.

FIG. 25 herein, is the short extruded aluminium or similar metal extension arm 13 encasing the short top hook and or ring plate 16, the short bottom hook and or ring plate 12, short snap housing plate 19, slider 11 and enclosed by means of the short cover 22 utilizing four hex socket countersunk screws 18 and two end-caps 14, 17 affixed with eight hex socket countersunk screws 18.

Figure 26:
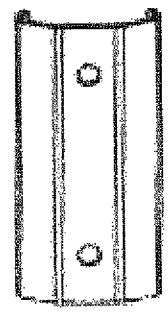
FIG. 26 Is a detailed view of the short snap housing plate.

FIG. 26 herein, is the short snap housing plate 19 which encases the short top hook and or ring plate 12 the short bottom hook and or ring plate 16 enabling operation of the rings to simultaneously open and close encased within the short extruded arm 13.

Figure 27:
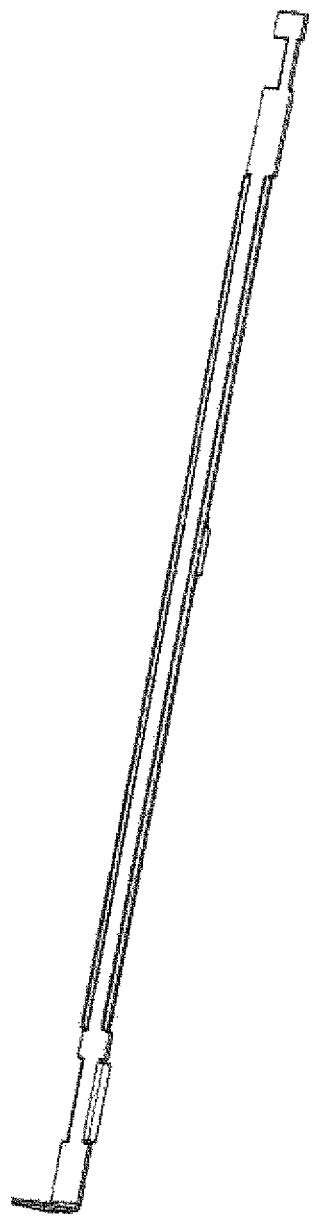
FIG. 27 Is a detailed view of the slider.

FIG. 27 herein, is the slider 11 and pull tab 15 featuring the extendable and retractable operation from retracted at twenty-two inches to extended at thirty-six inches when measured from end ring and or hook to end ring and or hook.

Figure 28:
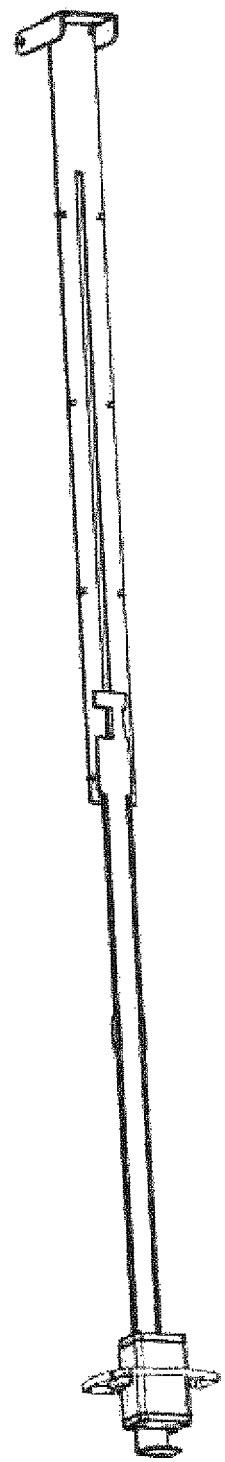
FIG. 28 Is a detailed view of the slider, large cover, hinge and extruded extension arm with assembled small short hook.

FIG. 28 herein, is the slider 11 featuring the short hook subassembly referencing FIG. 2 connected to the long cover 23 and slider bushing 21 enabling operation of the extendable and retractable feature.

Figure 29:
FIG. 29 Is a detailed view of the snap hook.
Figure 38:
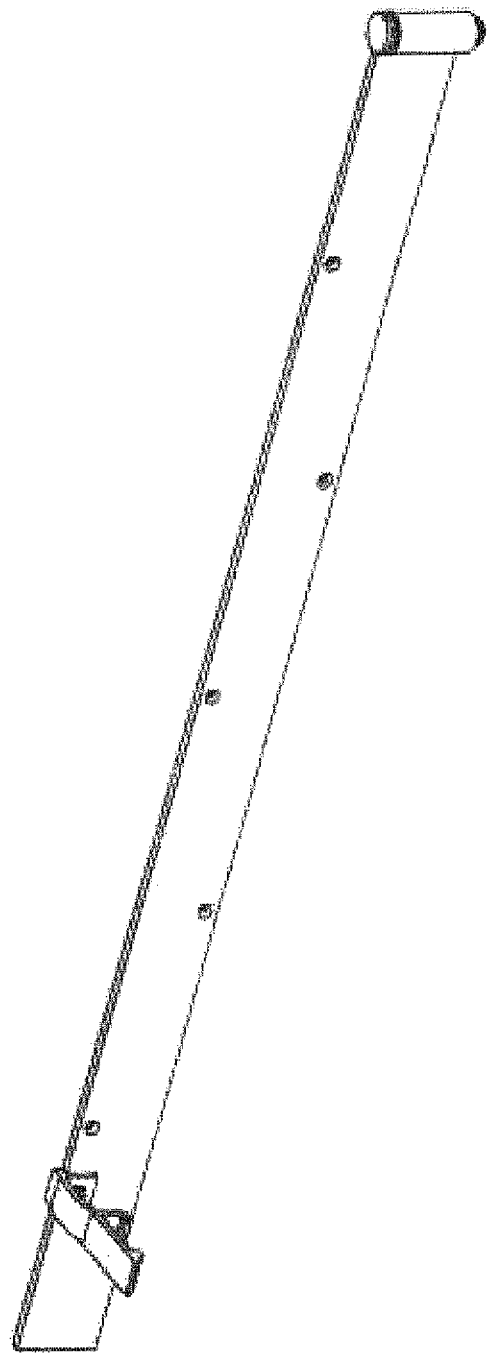
FIG. 38 is a detailed view of the mounting plate with affixed snap hook

FIG. 29 herein, is the snap hook 20 constructed of ABS, PC-ABS, nylon or similar affixed to the mounting plate 1 FIG. 38 enabling the pivoting arm FIG. 7 to lock into place when closed against mounting plate 1 on a vertical surface.

Figure 30:
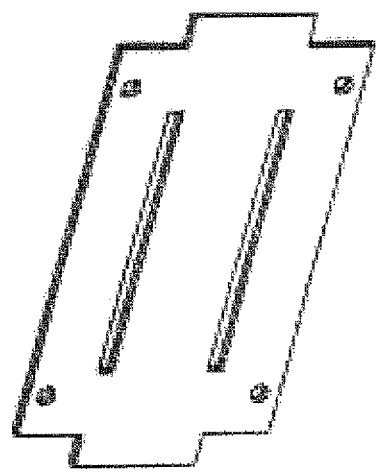
FIG. 30 Is a detailed view of the short cover.

FIG. 30 herein, is the small cover 22 that affixes to the back side of the short extruded arm 13 using four hex socket countersunk screws 18. Wherein, the small cover 22 and short extruded arm 13 encases with the end caps 14,17 the short top hook and or ring plate 12, short bottom hook and or ring plate 16, the short snap housing plate 19 and slider 11 with pull tab 15.

Figure 31:
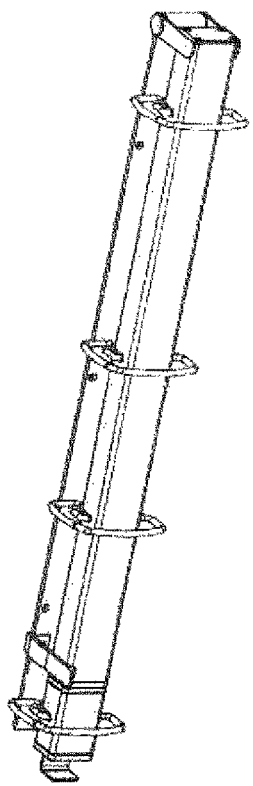
FIG. 31 Is a perspective view of the assembled apparatus closed.

FIG. 31 herein, is the full assembled apparatus and or poster hanger in the closed position featuring all 25-30 parts and depicting the aesthetic as to how it would be affixed to a vertical surface.

Figure 32:
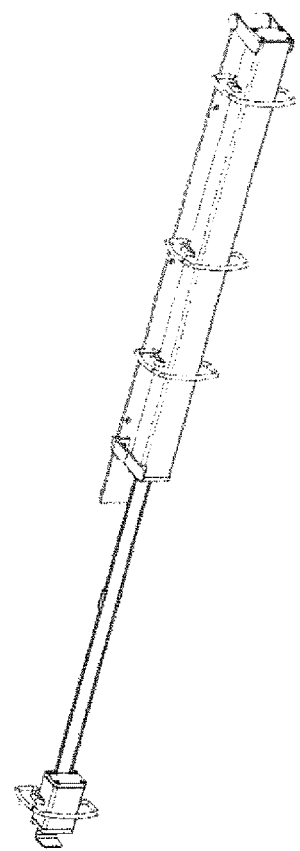
FIG. 32 Is a perspective view of the assembled apparatus extended.

FIG. 32 herein, is the full assembled apparatus and or poster hanger in the extended position featuring all 25-30 parts and depicting the aesthetic as to how it would be affixed to a vertical surface when extended for larger posters, papers, sleeves and or sheet protectors.

Figure 33:
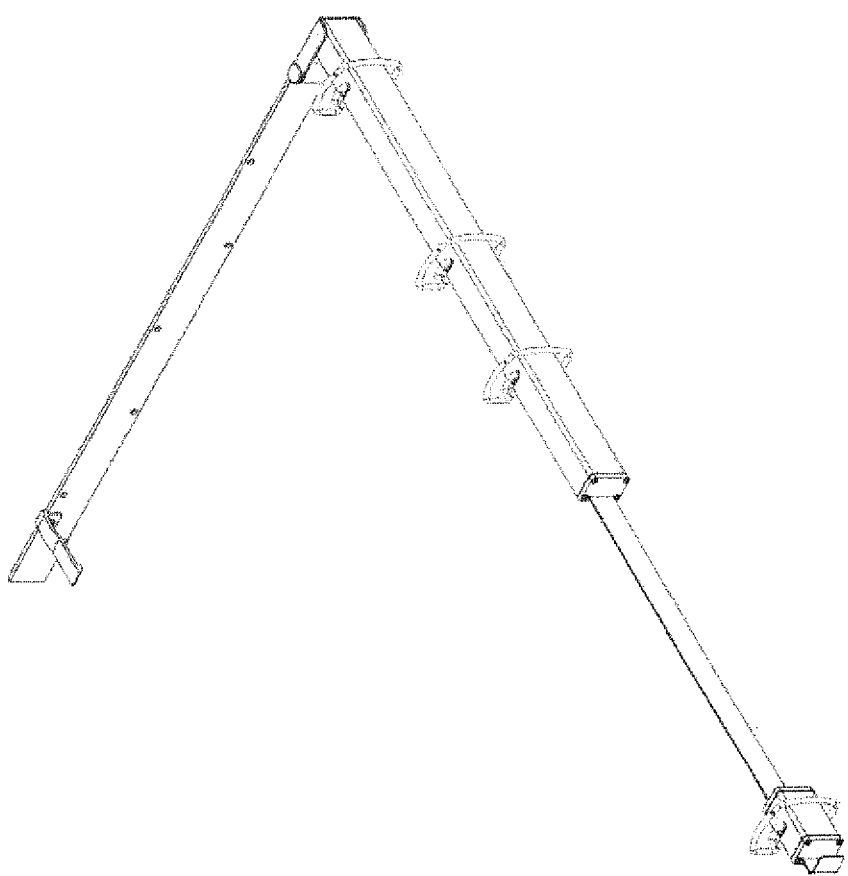
FIG. 33 Is a perspective view of the assembled apparatus extended and opened.

FIG. 33 herein, is the full assembled apparatus and or poster hanger in the extended and swung open position utilizing the hinge 7 and pivot pin 3 and pivot washer 4 for the purpose to flip posters, pages, papers, sleeves, and or sheet protectors and similar behind the next poster, paper, sleeves, and or sheet protector fitting within the curved groove of the short top hook and or ring plate 16 and long top hook and or ring plate 9.

Figure 35:
FIG. 35 Is a detailed view of the endcap.
Figure 34:
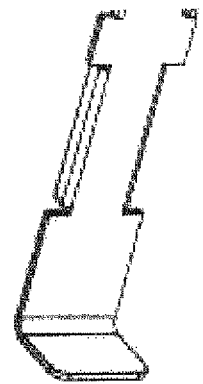
FIG. 34 Is a detailed view of the pull tab end of slider.

FIG. 34 herein, is the pull tab 15 end of the slider 11 wherein operation is expandable and or retractable FIG. 35 herein, is the end cap 14, 17, 25 utilized at both ends of the short extruded arm 13 and at the connecting and or extension end of the long extruded arm 10.

Figure 36:
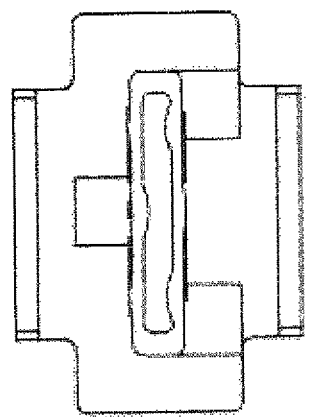
FIG. 36 Is a detailed view of the slider bushing.

FIG. 36 herein, is the slider bushing 21 optimizing function of the extendable and retractable operation.

Figure 37:
FIG. 37 is a detailed view of the hex socket countersunk head screws.

FIG. 37 herein, is the hex socket countersunk head screws 18 utilized to affix the small cover 22 and large cover 23 to the short extruded arm 13 and long extruded arm 10, the end caps 14, 17 to the short extruded arm 13 and the end cap 25 to the long extruded arm 10, affixes the hinge 7 to the long extruded arm 10, and the snap hook 20, utilizing twenty seven hex socket countersunk head screws 18.

FIG. 38 herein, is the mounting plate 1 affixed with the snap hook 20 utilized to hold the long pivoting arm FIG. 7 in a locked position when the fully assembled apparatus and or poster hanger is affixed to a vertical surface.

I claim:

1. A method of manufacturing a poster hanger with various sized plastic and/or vinyl sheet protectors, comprising:

manufacturing, by CNC tooling and injection molding, a mounting plate composed of iron and/or steel, the mounting plate comprising a plurality of holes for screw placement in order to affix the mounting plate to a vertical structure and/or wall; connecting to the mounting plate a pivoting arm with a hinge, a pivot pin and multiple washers; wherein the mounting plate further comprises a snap-hook designed to lock the pivoting arm in place when the pivoting arm is in a closed position; wherein the snap-hook and a plurality of end-caps are injection molded; wherein the hinge, pin, and washers are CNC turned on a lathe and made of steel, iron, or aluminum;

wherein the pivoting arm when fully assembled is configured to swing away from the mounting plate; wherein the pivoting arm further comprises an extension feature comprising a slider, a pull-tab extension of the slider, a first snap housing plate, a second snap housing plate, a first cover and/or a long extruded arm, a second cover and/or a short extruded arm, a slider bushing, a plurality of screws, and four completed hooks and/or rings on four hook plates housed within the two extruded arms, wherein the long extruded arm is substantially longer than the short extruded arm; wherein a first three of the four completed hooks and/or rings are affixed on a long top hook plate and a long bottom hook plate housed within the first cover and/or long extruded arm and simultaneously open and close while supported on the first snap housing plate, and a fourth of the four completed hooks and/or rings is affixed on a short top hook plate and a short bottom hook plate housed within the second cover and/or short extruded arm and simultaneously opens and closes while supported on the second snap housing plate; wherein the long top hook plate comprises three hook-halves, each constructed with a grooved nook and forming one-half of the first three completed hooks and/or rings, the long bottom hook plate comprises three pairing hook-halves forming a second-half of the first three completed hooks and/or rings, the short top hook plate comprises one hook-half constructed with a grooved nook and forming one-half of the fourth completed hook and/or ring, and the short bottom hook plate comprises one pairing hook-half forming a second-half of the fourth completed hook and/or ring;

wherein the long and short extruded arms are extruded, cut to length and machined, sandblasted and anodized;

wherein the slider is configured to extend, in conjunction with the short extruded arm, from 22 inches in a retracted position to 36 inches in an extended position, measured as a distance between a hook at a hinge-end of the pivoting arm to an extension hook on the short extruded arm;

providing four sizes of the various sized sleeve dividers and/or sheet protectors, including compartmentalized sleeves, wherein the sleeve dividers and/or sheet protectors are transparent and/or optionally frosted, the four sizes comprising: a first horizontal size measuring 998 mm×772 mm; a first vertical size measuring 640 mm×1006 mm, a second horizontal size measuring 772 mm×538 mm; and a third horizontal size measuring 457.2 mm×386.5 mm; wherein the sleeve dividers and/or sheet protectors are manufactured from plastic using die cutting and molding, and each is provided with pre-hole-punched holes at a top thereof using a heat-press process and grommets;

wherein the sleeve dividers and/or sheet protectors are designed with specific pre-hole-punched hole placements at the top of each sleeve divider and/or sheet protector to align with corresponding hooks on the pivoting arm, wherein a first hole placement for each sleeve divider and/or sheet protector measures 50.8 mm from a right of a sleeve-end to a first hole on a hinge-end of each sleeve divider and/or sheet protector, a second hole from the first hole on center measures 215.9 mm for each sleeve divider and/or sheet protector, a third hole from the first hole measures 406.4 mm for each sleeve divider and/or sheet protector, the third hole to a fourth hole on the first vertical size measures 174.4 mm, and a fourth hole on the first horizontal size measures 901.7 mm from the first hole of the first horizontal sleeve.

2. The method according to claim 1, wherein the pivoting arm is expandable in length using the slider and slider bushing manually to extend and retract the slider and the short extruded extension arm such that a greatest distance between the hook on the hinge end of the pivoting arm to the extension hook on the short extruded arm when expanded is 36 inches.

3. The method according to claim 1, wherein the poster hanger is configured to hang, stack, and/or flip various papers, posters, sheet protectors, and dividers on the hooks and/or rings, whereby these materials can be hung, stacked, and/or flipped when the assembled poster hanger is in the retracted or extended position using the slider.

4. The method according to claim 1, wherein the pivoting arm swings open on the hinge end of the pivoting arm 90° away from the mounting plate.

* * * * *